(12) United States Patent
Behar

(10) Patent No.: US 9,944,338 B2
(45) Date of Patent: Apr. 17, 2018

(54) DEVICE AND METHOD FOR A COLLAPSIBLE ELECTRIC SCOOTER

(71) Applicant: Mayer Behar, Hollywood, FL (US)

(72) Inventor: Mayer Behar, Hollywood, FL (US)

(*) Notice: Subject to any disclaimer, the term of this patent is extended or adjusted under 35 U.S.C. 154(b) by 0 days.

(21) Appl. No.: 15/011,164

(22) Filed: Jan. 29, 2016

(65) Prior Publication Data
US 2016/0221629 A1 Aug. 4, 2016

Related U.S. Application Data

(60) Provisional application No. 62/109,285, filed on Jan. 29, 2015.

(51) Int. Cl.
| | |
|---|---|
| *B62K 5/027* | (2013.01) |
| *B62K 19/30* | (2006.01) |
| *B62K 15/00* | (2006.01) |
| *B62K 5/025* | (2013.01) |
| *B62J 1/28* | (2006.01) |
| *B62K 19/40* | (2006.01) |
| *A61G 5/04* | (2013.01) |

(52) U.S. Cl.
CPC ............ *B62J 1/28* (2013.01); *B62K 5/025* (2013.01); *B62K 15/006* (2013.01); *B62K 15/008* (2013.01); *B62K 19/30* (2013.01); *B62K 19/40* (2013.01); *A61G 5/042* (2013.01); *B60Y 2200/126* (2013.01); *B62K 5/027* (2013.01); *B62K 2202/00* (2013.01); *B62K 2208/00* (2013.01)

(58) Field of Classification Search
CPC .......... B62K 5/025; B62K 5/027; B62K 5/00; B62K 5/06; B62K 19/30; B62K 15/00; B62K 15/006; B62K 15/008; B62K 2208/00; B62K 2202/00; B62K 11/02; B60K 1/00; B60L 2220/44; A61G 5/042; B60Y 2200/126

USPC ....... 180/208, 210, 211, 212, 213, 214, 220, 180/223, 224, 65.51

See application file for complete search history.

(56) References Cited

U.S. PATENT DOCUMENTS

| | | | | |
|---|---|---|---|---|
| 8,310,205 | B1 * | 11/2012 | Hamburgen | H02J 7/0073 320/107 |
| 8,838,308 | B2 * | 9/2014 | Meyers | B62J 17/00 174/53 |
| 8,915,512 | B2 * | 12/2014 | Kim | B62K 15/00 280/287 |
| 2001/0045723 | A1 * | 11/2001 | Niitsu | B62K 15/008 280/287 |
| 2013/0270016 | A1 * | 10/2013 | Donnell | B60K 16/00 180/2.2 |

\* cited by examiner

*Primary Examiner* — Keith Frisby
(74) *Attorney, Agent, or Firm* — Greg M. Popowitz; Assouline & Berlowe, P.A.

(57) ABSTRACT

A collapsible electric scooter, including a base frame enclosing an electric power source, a front assembly rotatably secured to the base frame, where the front assembly includes at least one motorized wheel secured to a front riser with a handle bar, a seat assembly removably secured to the base frame; and a rear assembly rotatably secured to at least one axle of the base frame, where the rear assembly includes at least one rear wheel and at least one rear axle support.

6 Claims, 7 Drawing Sheets

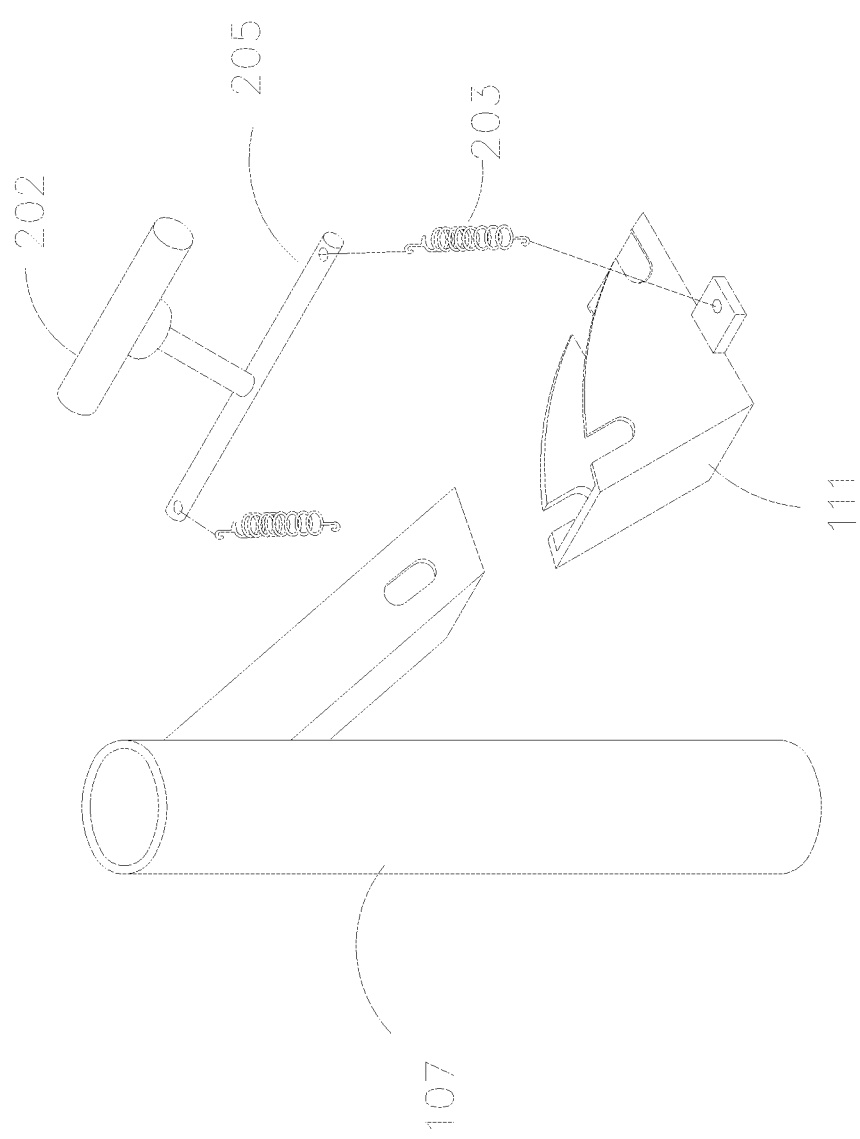

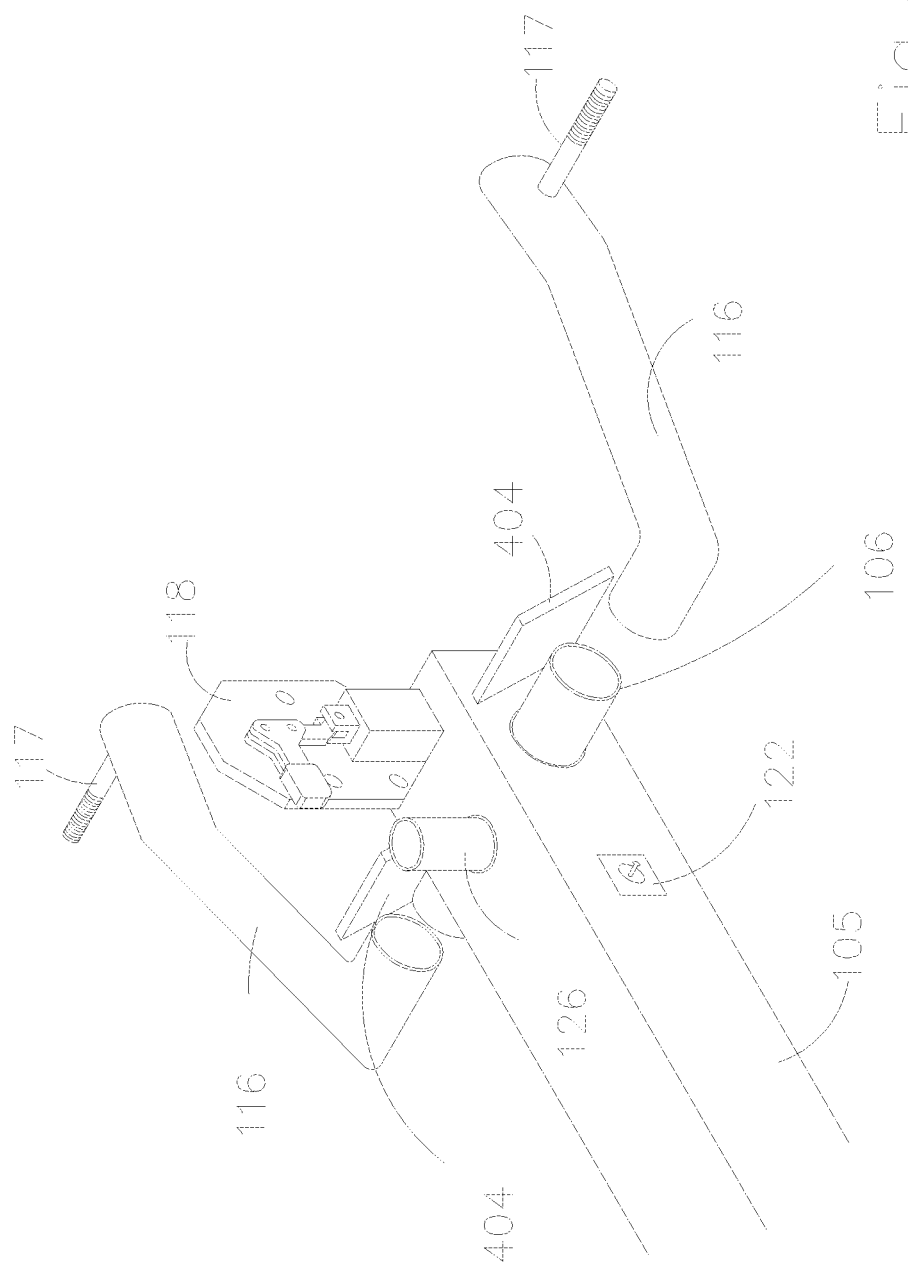

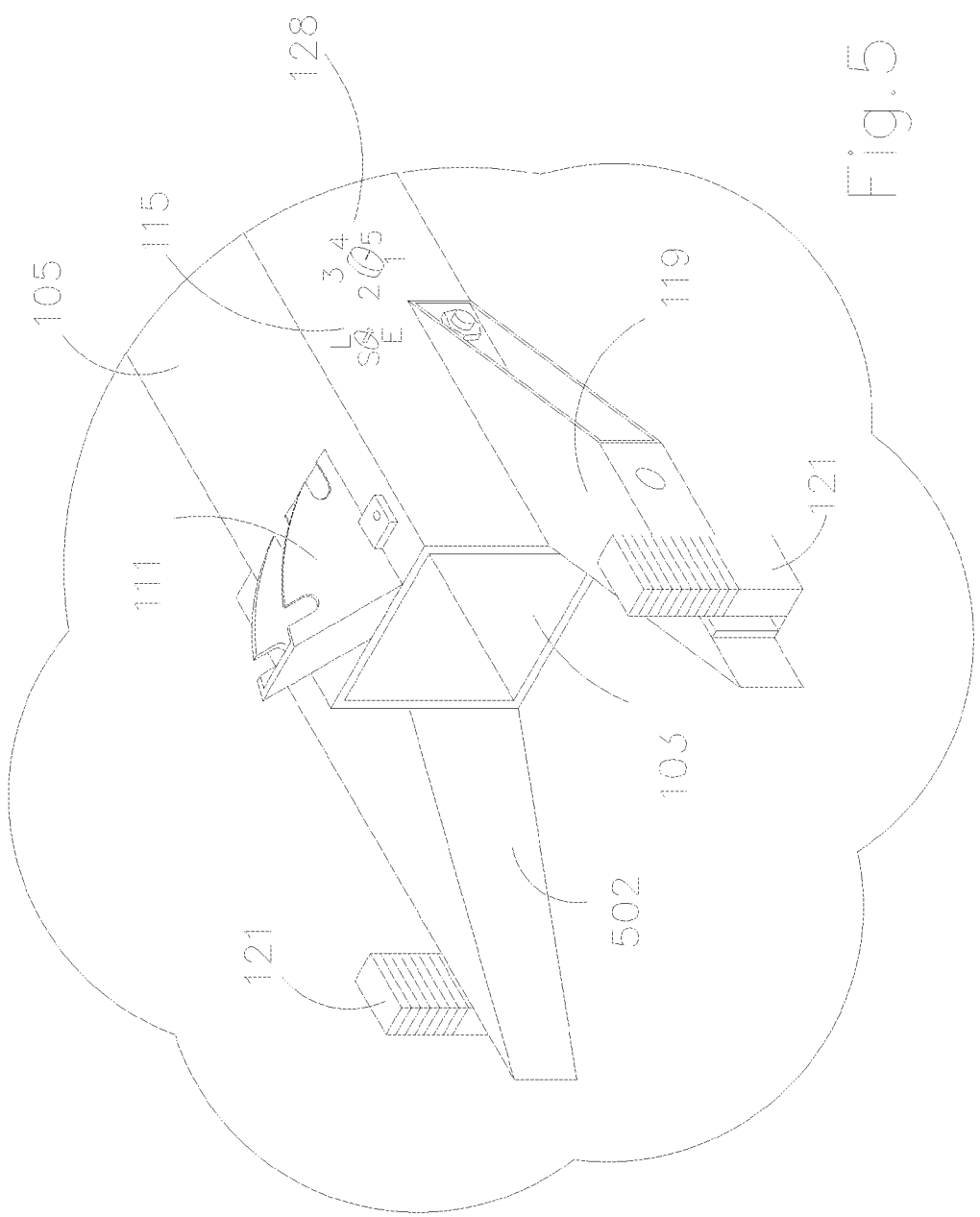

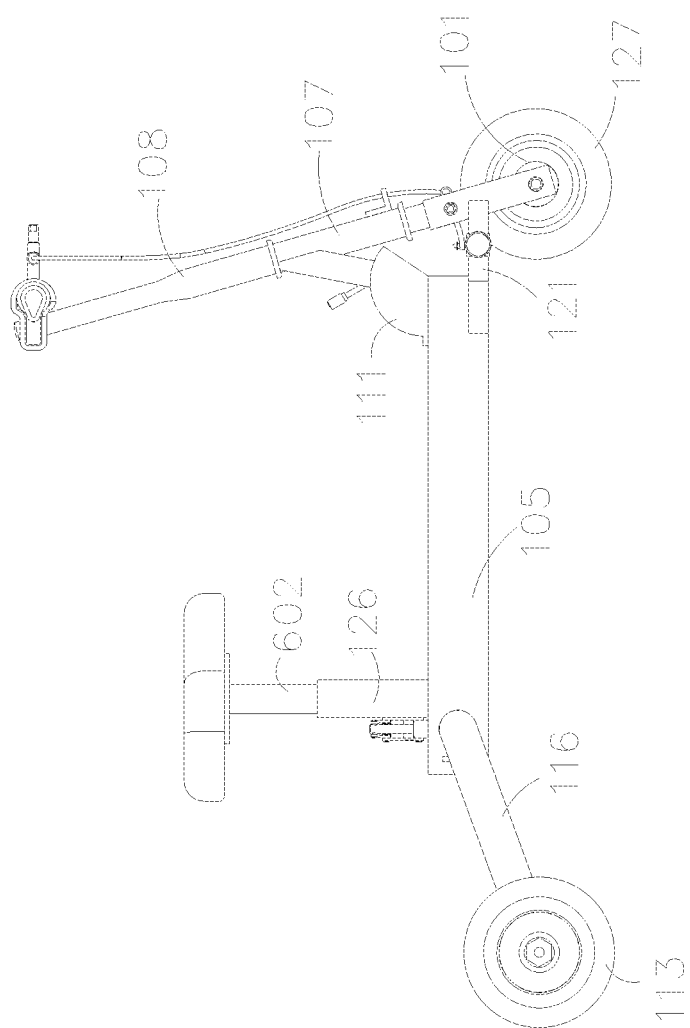

DEVICE AND METHOD FOR A COLLAPSIBLE ELECTRIC SCOOTER

CROSS-REFERENCE TO RELATED APPLICATIONS

This patent application claims the benefit under 35 U.S.C. § 119(e) of U.S. Provisional Patent Application No. 62/109,285, filed Jan. 29, 2015, which application is incorporated herein by reference.

BACKGROUND OF THE INVENTION

Field of the Invention

The invention broadly relates to a device for transportation, and more specifically to a collapsible electric scooter, even more particularly to a method of collapsing an electric scooter.

Description of the Related Art

Current electric scooters do not allow a user to efficiently collapse the scooter in a few movements and carry the collapsed scooter with minimal effort. Electric scooters typically collapse at each wheel and are quite bulky when fully collapsed. When a user tries to pick up a collapsed scooter in order to relocate it, the collapsed scooter places tremendous strain on the muscles and joints in the human body, which often causes injury to the user attempting to move the scooter. Given that most users of scooters are either elderly or have a physical need for the use of such a scooter, presently available scooters are difficult to collapse and carry.

Although numerous scooters today have tried to make collapsible versions, they remain extremely bulky and make it difficult for the users to move without the assistance of others or without tremendous strain on their body. Scooters are often utilized to remove the physical stress and/or pain the user is experiencing due to the various physical constraints of the user. Use of the scooter itself may be helpful, but users of today's scooters are still hampered by the size of the scooters, when collapsed, and the difficulty in collapsing the scooters through a simple operation.

In addition, current scooters are designed to prevent the scooter and user from tipping over while the scooter is turned. To achieve this, current scooters are often high off the ground to provide a higher center of gravity, which aids in preventing the scooter from tipping over while turning. Unfortunately, this higher design makes it more difficult for the user to mount and dismount from the scooter.

Thus, there is a long-felt need to develop a new type of collapsible electric scooter that is simple to collapse, compact when collapsed, and light weight to allow the user to move the scooter with minimal physical impact. Moreover, there is a further need for a scooter with a lower center of gravity that will still prevent the scooter from tipping over, while providing a lower mounting and dismounting position for the user. There is also a further need for a method of collapsing the electric scooter that allows the user to efficiently collapse the components of the scooter into a compact position for carrying.

BRIEF SUMMARY OF THE INVENTION

An object of the invention is to provide a collapsible electric scooter, including a base frame enclosing an electric power source, a front assembly rotatably secured to the base frame, where the front assembly includes at least one motorized wheel secured to a front riser with a handle bar, a seat assembly removably secured to the base frame; and a rear assembly rotatably secured to at least one axle of the base frame, where the rear assembly includes at least one rear wheel and at least one rear axle support.

Another object of the invention is to provide a collapsible electric scooter, including a base frame enclosing a battery and control box, a front assembly rotatably connected to the base frame using a lock rod, wherein the front assembly includes at least one wheel housing a motor, a fork and head tube, wherein said head tube connects to a handle bar with throttle controls, the head tube of the front assembly rotates about a folding hinge connected to the base frame, a seat support protruding from the base frame, a seat assembly removably secured to the seat support through a seat post, and a rear assembly rotatably secured to an axle of the base frame using a rear pin, wherein the rear assembly includes at least two rear axle supports rotatable about the rear axle, and at least two rear wheels secured to the rear axle supports.

Yet another object of the invention is to provide a method for using a collapsible electric scooter, including disengaging a lock rod rotatably securing a front assembly to a base frame, rotating the front assembly inward onto said base frame, disengaging a rear pin rotatably securing a rear assembly to the base frame, and rotating the rear assembly inward onto the base frame.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is an exploded perspective view of the front collapsible mechanism of the collapsible electric scooter.

FIG. 4 is an exploded perspective view of the rear collapsible mechanism of the collapsible electric scooter.

FIG. 5 is a front perspective sectional view of the frame of the collapsible electric scooter.

FIG. 6 is side view of the fully assembled collapsible electric scooter.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "scooter" is synonymous with terms such as "bike", "moped", "minibike", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
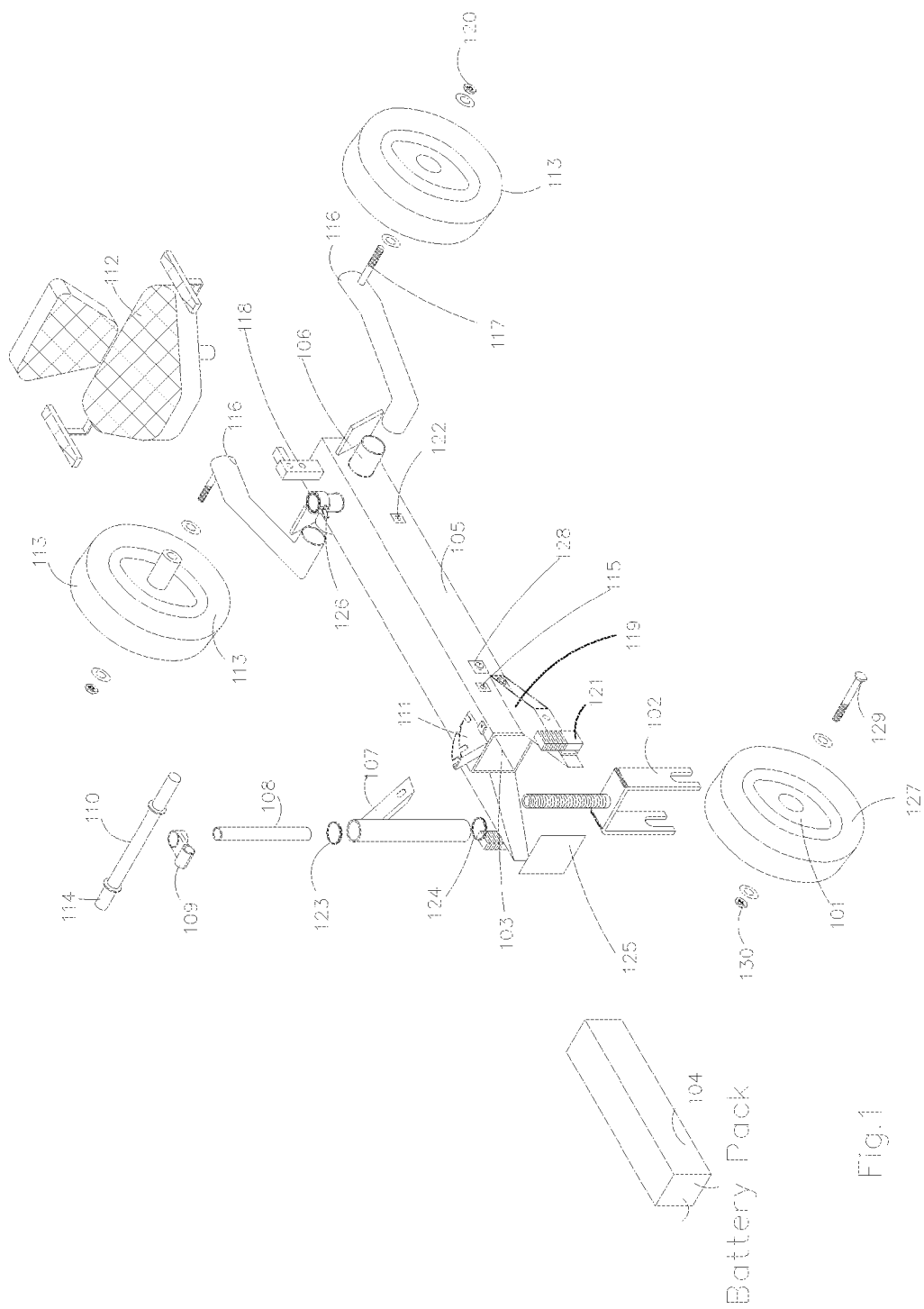
FIG. 1 is an exploded perspective view of the collapsible electric scooter device according to the invention.

Adverting now to the figures, FIG. 1 shows an exploded perspective view of the collapsible electric scooter of the present invention. The scooter includes a base frame 105, as shown in FIG. 1. The power source, i.e. battery 104, and control box 103 are enclosed within base frame 105 and shielded from the environment using battery cover 125, which optionally includes a battery power switch that turns the battery on and off. Control box 103 houses the electronic systems that control the operation of motor 101, along with other electronic components of the present invention. Control box 103 connects to battery 104 and functions to control the operation of the present invention. The front wheel assembly includes motor 101 and front wheel 127.

Placing battery 104 within base frame 105 shields battery 104 from the elements of nature, which include water, dirt, and other debris. Battery 104 operates within the closed environment of base frame 105 and does not cause degradation in battery efficiency due to the closed environment since the battery does not emit significant heat. Although numerous batteries are available, the present invention uses a single pack NiMH battery, 12 v 5,000 MaH, 10 Amps for battery 104.

Base frame 105 is a single, unitary frame from which the rest of the scooter is based. The inside of base frame 105 is hollow to allow the control box 103 and battery 104 to be housed within the base frame 105. Additionally, manufacturing base frame 105 in hollow form provides weight savings that correlates to increased battery 104 efficiency. The single, unitary construction of base frame 105 provides a unique design that creates a stable ride by the user, and allows for minimal effort for the user to collapse and transport the scooter when not in use.

Base frame 105 is positioned at the center of the scooter, directly connecting the various components of the scooter. In addition, base frame 105 is positioned with a low ground clearance compared to known electric scooters, i.e. the scooter sits lower on the ground. This provides the user improved ergonomic movement when mounting and dismounting the scooter. Additionally, the low ground clearance provides a more stable platform for the user while going around turns since the scooter is less likely to tip over.

As shown in FIGS. 1 and 5, foot peg supports 119 are connected to the front portion of base frame 105. Rotatable foot pegs 121 connect to foot peg supports 119. While in use, foot pegs 121 are rotated outward to a horizontal position, substantially parallel to the ground, which allows the user riding the collapsible scooter to secure his feet on foot pegs 121. Foot pegs 121 allow the user to keep his feet elevated to avoid hitting the ground while the scooter is in motion. As illustrated in FIG. 1, foot pegs 121 are preferably in a vertical position when not in operation. In an exemplary embodiment, foot pegs 121 include a platform that provides additional support for the bottom of the user's foot. In another exemplary embodiment, the foot peg is shaped to support a user's ankle or leg that is in a case, instead of the foot. In this embodiment, the user's leg is extended farther.

An advantage of the present invention is the positioning of the user's feet while riding the scooter. The design of most scooters position the user's legs at an approximate 90degree right angle to their feet. Such positioning creates strain on the user's knees after prolonged use of the scooter. This is particularly true of users who use the scooter multiple times a day to move around town, as opposed to someone who uses the scooter intermittently. The design of the present invention allows the user's legs to create an acute angle to exert less pressure on the user's knees. Due to the lower stance of the scooter, the foot pegs 121 are positioned farther away from the scooter's seat assembly 112. This creates an ergonomic position for the user and decreases the amount of strain on the user's knees.

Folding hinge 111 is secured to the top front portion of base frame 105. Folding hinge 111 includes multiple slots to permit the front portion of the scooter to collapse, when desired. As illustrated in FIG. 2, head tube 107 connects to folding hinge 111 using lock rod 205 or other similar securing device. Lock rod 205 is engaged and disengaged by the user moving lock handle 202. Lock rod 205 is tensioned onto folding hinge 111 using two lock springs 203, shown in FIG. 2. Although two lock springs 203 are shown, one lock spring 203 may be used to secure lock rod 205 in folding hinge 111. In exemplary embodiments of the invention, other tension devices, such as pulleys, elastic bands, and other tensioning connections are used to secure lock rod 205 in folding hinge 111.

Materials for the frame and support components of the present invention vary and can be made of a variety of known materials. Where possible, aluminum T6066 is used for components included in the present invention. If aluminum is not possible based on the design requirements, steel is used. Preferably, the material is lightweight to maintain the low weight of the scooter. Several of the components are constructed using carbon fiber and others using cast aluminum pieces. Materials are modified depending on the strength and weight requirements of the scooter model.

When lock rod 205 is engaged in the upper slot of folding hinge 111, the front portion of the scooter, including head tube 107 and stem 108, is vertical and positioned for the user to ride on the scooter. When lock rod 205 is engaged in the lower slot of folding hinge 111, the front portion of the scooter is substantially horizontal, i.e. parallel to base frame 105, one step is allowing the scooter to be fully collapsed by the user. The lock rod 205 is engaged and disengaged manually by the user pulling or pushing on lock handle 202, with the mechanical assistance of lock springs 203. This allows the user to disengage lock rod 205, which connects head tube 107 with folding hinge 111, to move the front assembly in the upright or collapsed position. In an exemplary embodiment, a lighting system is installed on stem 108 to project light outward from the scooter during operation in dark environments. Lighting systems may include, but are not limited to, LED lights, fluorescent bulbs, and incandescent bulbs.

The upper cylindrical portion of front fork 102 inserts into a portion of head tube 107, including lower ball bearing 124. As shown in FIG. 1, front fork 102 resembles the shape of a pitch fork. The lower prongs of front fork 102 connect to motor 101 and front wheel 127 on the collapsible electric scooter using front stem bolt 129 and front hardware 130. Front wheel 127 includes electric motor 101 enclosed in a tire and wheel. The present invention utilizes a 220 watt, 24 volt electric motor that can provide forward and reverse movement. The electric motor 101 of front wheel 127 is electronically connected to control box 103, which is connected to battery 104. Battery 104 is currently a NiMH Battery Pack with 10 amps. Motor 101 is a hub motor with 220 Watts and 24 Volts. Stem bolt 129 secures motor 101 to front fork 102.

Moving upwards on the front assembly of the collapsible electric scooter, head tube 107 is connected to stem 108, which includes upper ball bearing 123. Stem 108 connects to handle connector 109, which in turn provides support to hold handle bar 110. A user operates the collapsible electric scooter by placing his hands on throttle controllers 114 on handle bar 110. By turning throttle controllers 114, the user changes the speed of the scooter. Throttle controllers 114 connect to control box 103 to increase or decrease the power output of the scooter. In addition, when the user changes the direction of handle bar 110 it causes the direction of front tire 127 to change. Consequently, this causes the scooter itself to change direction. Although throttle controllers are used herein, digital and other known control mechanisms known in the field are interchangeable for the user to change the speed of the present invention.

In an exemplary embodiment, the scooter includes a torque dial 128 to vary the power of the scooter. By changing the power of the scooter, the user can vary how fast the scooter increases speed. As shown in FIG. 5, torque dial 128 includes 5 positions to vary the torque of the scooter.

The present invention includes a braking system to slow the scooter down and allow the scooter to come to a complete stop. Although users can remove their feet from the scooter and stop the scooter manually at low speeds, the present invention has a braking system on the front wheel assembly. The braking system creates friction on the front wheel 127 to reduce the speed of the scooter. By continuing to apply the braking system, the user can cause the scooter to come to a full and complete stop. Braking distance and speed are proportional to the weight of the scooter and the speed at which the scooter is traveling. In an exemplary embodiment, the braking system includes disk brakes engaged with front wheel 127. A brake handle located on the handle bar 110 engages the braking system. In another exemplary embodiment, the braking system includes a parking brake to keep the scooter stationary when it is located on an inclined or declined surface. The parking brake handle is operatively positioned on the brake handle.

Working backwards from the front of base frame 105, outlets for power switch 115 and torque dial 128 are included. Power switch 115 is a switch that opens or closes the electrical circuit that provides power to motor 101. Turning off power switch 115 when the scooter is not in use saves battery charge and allows for more efficient operating time by not draining battery 104.

Further down base frame 105, charger port 122 provides the user access to charge battery 104 using an external power supply, such as a wall outlet. Since battery 104 is enclosed inside base frame 105, direct access to charge battery 104 is difficult. Charging port 122 provides the user direct access to battery 104 to charge and recharge battery 104 throughout its useful life. A charging cord is inserted into charging port 122 to charge battery 104 using an external power supply for continued use.

Figure 3B:
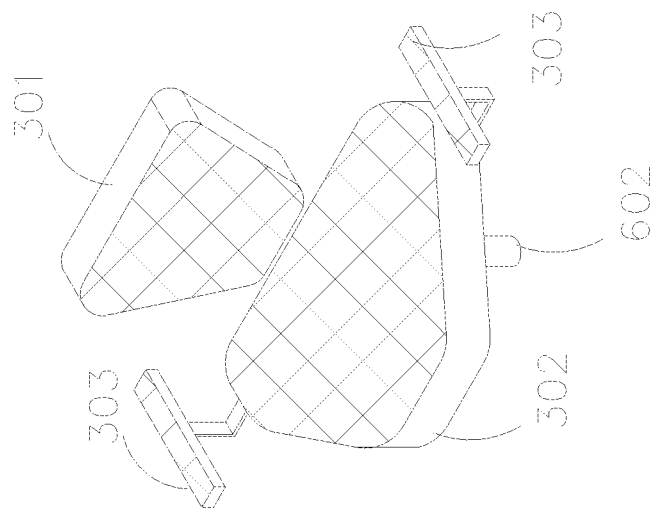
FIG. 3B is a front perspective view of the rear seat assembly of the collapsible electric scooter.
Figure 3A:
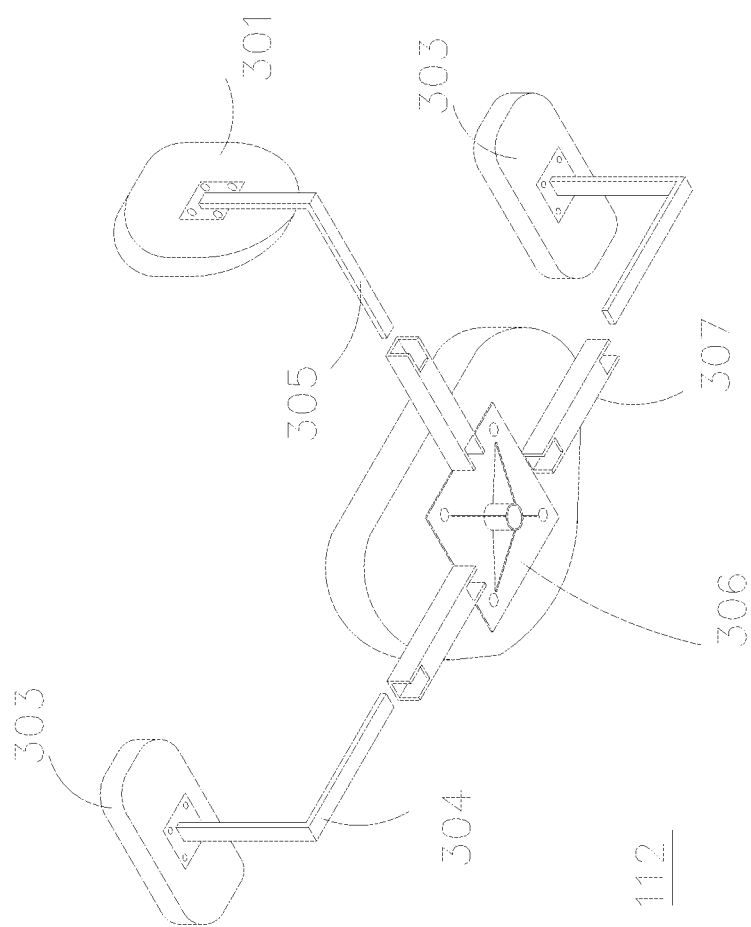
FIG. 3A is an exploded bottom perspective view of the rear seat assembly of the collapsible electric scooter.

Continuing to the rear of the scooter on base frame, seat support 126 extends vertically upward from the top of base frame 105. Seat support 126 provides support for seat post 602, is attached to seat assembly 112 that is depicted in FIGS. 3A, 3B, and 6. Seat assembly 112 is attached to seat post 602 using seat platform 306. Seat post 602 connects to seat platform 306 and extends downward. Seat post 602 removably connects to seat support 126, thereby providing a stable support for the user to sit on the scooter. In an example embodiment of the present invention, seat platform 306 is supported by seat post 602 using a spring assembly, shock absorber, or other mechanism known in the industry. Such a spring assembly absorbs the bumps and road variations, thereby lessening the impact on the user sitting on seat assembly 112 of the present invention while in motion. In an exemplary embodiment, seat post 602 is constructed using carbon fiber material.

Shown in FIGS. 3A and 3B, seat platform 306 connects to the bottom of seat cushion 302, where the user sits when using the scooter. During typical use of the scooter, a user's buttocks make contact with the top of the seat cushion 302. Base channels 307 extend outward from seat platform 306. Two base inserts 307 connect to two arm rest inserts 304, which are secured to arm rests 303. Arm rests 303 provide a resting place for the user's arms while riding the scooter. An additional base insert 307 connects to back rest insert 305, which is secured to back rest 301. Back rest 301 allows the user to sit comfortably with support for the user's back while operating the scooter. Seat assembly 112 provides a stable and secure base for the user to sit while operating the collapsible electric scooter.

Seat assembly 300 has multiple embodiments to fit the needs of users. As illustrated in FIG. 6, the scooter includes only a cushioned seat bottom. In one exemplary embodiment, the seat assembly is an ergonomic unitary bucket seat that provides support for the user's buttocks and lower back. In another exemplary embodiment, the seat assembly includes a seat bottom and adjustable back support, preferably cushioned.

The rear section of base frame 105 also includes the rear wheels 113, as shown in FIG. 1. FIG. 4 illustrates how rear axle 106 extends through the side portions of base frame 105 and projects outward from two sides of base frame 105. Rear axle 106 connects to rear axle supports 116. Rear stem extensions 117 are located at the opposite end of where rear axle supports 116 connect to base frame 105. Rear stem extensions 117 secure rear wheels 113 to rear axle support 116, using washer and nuts 120, or a similar securing mechanism.

A significant benefit of the present invention is the manner in which the scooter collapses. To begin rotating, i.e. collapsing, the rear assembly of the scooter about base frame 105, the user removes seat assembly 112, along with seat post 602, from seat support 126 on the base frame 105. To disengage the rear axle 106, the user releases rear pin 118, connected to base frame 105. This allows rear axle supports 116 to rotate in relation to base frame 105. While in use as a scooter, rear axle supports 116 and rear wheels 113 are rotated about base frame 105 in a position that allows rear wheels 113 contact with the ground. During release of release pin 118 and collapse of the rear assembly, both the left and right axle supports 116, rotate in unison inward towards base frame 105. After disengaging release pin 118, the entire rear assembly connected to real axle supports 116 rotate in unison.

While in use, rear pin 118 is in the locked position, thereby locking the connection between rear axles supports 113 and rear axle 106. To collapse the rear wheel assembly, rear pin 118 is disengaged, i.e. opened, thereby allowing rear axle supports 116 to rotate relative to rear axle 106 and base frame 105. In the preferred embodiment, the rear assembly rotates underneath base frame 105. Rear stops 404 limit the travel of rear axle support 116 when real axles supports 116 are rotated. Notably, since both rear wheels 113 are ultimately connected to rear axle 106, the user collapses the entire rear wheel assembly in one rotating motion once the rear pin 118 is disengaged. When in the collapsed position, rear pin 118 is re-engaged to secure rear axle supports 116 in place to avoid unintended rotation movement.

When the user is ready to reopen the rear wheel assembly, the user disengages the rear pin 118, and rotates the rear axle supports 116 outward to the open position, whereby the rear wheels 113 are in contact with the ground. The ability of the user to collapse both rear wheels at the same time provides an efficient way to collapse the present invention.

Figure 7:
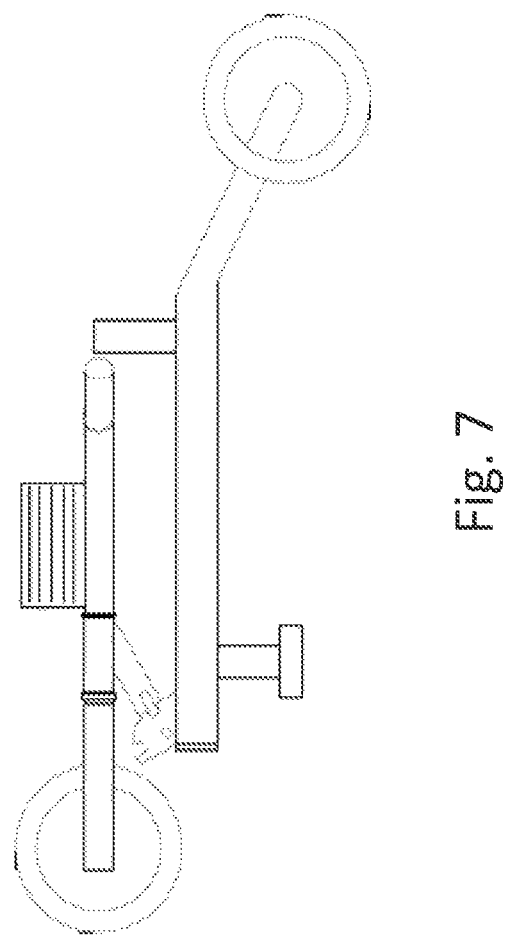
FIG. 7 is a side view of the invention in a collapsed position.

A similar process is utilized to collapse the front wheel assembly, pictured in FIG. 7. When the user is ready to collapse the scooter, the user pulls on lock handle 202, which causes lock rod 205 to disengage from the upper slot of folding hinge 111 and head tube 107. When disengaged, the entire front assembly, including head tube 107, front wheel 127, handle bar 110, and the corresponding connections, rotate inward toward base frame 105. When collapsed, lock handle 202 is pushed forward, thereby engaging lock rod 205 into the lower slot of folding hinge 111. Similar to the rear assembly, the user changes the front assembly from a collapsed to an open position simply by engaging and disengaging lock rod 205 in and out of the slots on folding hinge 111.

When the scooter is ready to be collapsed, the rear assembly and the front assembly of the scooter rotate inward; front assembly rotating inward to the top of base frame 105, and rear assembly rotating inward to the bottom of base frame 105. In an exemplary embodiment, once the scooter's front and rear assemblies are collapsed, a strap is wrapped around the collapsed front and rear assemblies, along with the base frame, to provide an additional mechanism to secure the scooter in the closed position. The strap also provides a handle to allow the scooter to be carried by a user. To open the scooter, the reverse steps are followed, the strap is removed, lock rod 205 and rear pin 118 are disengaged, both assemblies are rotated outward, lock rod 205 and rear pin 118 are re-engaged, and the seat assembly 112 is reattached to seat support 126.

In a typical embodiment of the present invention, the user is riding the collapsible electric scooter. When the user has finished riding the scooter, or should the battery become drained from prolonged use, both the front and rear portion of the scooter are collapsed for carrying or for storage. For instance, if a user wants to store the scooter in the trunk of his vehicle, the operational scooter will not fit into a truck due to the span of the scooter when both the front and rear assemblies are in the open position ready for use.

When both the front and rear assemblies, as described above, are collapsed, both assemblies are substantially in line with the base 105. The height of the scooter is reduced by collapsing front assembly onto the base frame 105, and the length and height of the rear assembly is reduced by rotating the rear axle supports 116 about rear axle 106 and base frame 105. The scooter collapses at two junctures. When collapsed, the user can easily pick up the present invention and store it in a vehicle truck or any other compact space. If needed, a user is able to lift the collapsed scooter with one hand to store it. This allows the user to use his other hand to keep his body stable when collapsing the front and rear assemblies, and when storing the scooter.

The present invention also includes a method for using the collapsible electric scooter. Collapsing the scooter begins by disengaging lock rod 205 from the upper slot on folding hinge 111, which is rotatably securing the front assembly to base frame 105. Next, the user rotates the front assembly inward onto base frame 105 and re-engages lock rod 205 into the lower slot of folding hinge 111. Once the front assembly is collapsed, the user disengages rear pin 118, which rotatably secures rear assembly to base frame 105. Once rear pin 118 is disengaged, the user rotates the rear assembly inward onto said base frame. Next rear pin 118 is reengaged to secure the rear assembly.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A collapsible electric scooter, comprising:
    a base frame enclosing a battery and control box;
    a front assembly rotatably connected to said base frame using a lock rod, wherein said front assembly includes:
        at least one wheel housing a motor;
        a fork and head tube, wherein said head tube connects to a handle bar with throttle controls;
    said head tube of said front assembly rotates about a folding hinge connected to said base frame;
    a seat support protruding from said base frame;
    a seat assembly removably secured to said seat support through a seat post; and
    a rear assembly rotatably secured to a rear axle of said base frame using a rear pin, wherein said rear assembly comprises:
        at least two rear axle supports rotatable about the rear axle; and
        at least two rear wheels secured to said rear axle supports.

2. The collapsible electric scooter recited in claim 1, further comprising a power switch connected to said battery.

3. The collapsible electric scooter recited in claim 1, further comprising a means for torque control.

4. The collapsible electric scooter recited in claim 1, wherein said seat assembly comprises a seat cushion and back rest.

5. The collapsible electric scooter recited in claim 1, further comprising at least one foot peg connected to said base frame.

6. The collapsible electric scooter recited in claim 1, further comprising a charging port to charge said electric power source.

* * * * *